US012630141B2

(12) United States Patent
Ninomiya et al.

(10) Patent No.: US 12,630,141 B2
(45) Date of Patent: May 19, 2026

(54) VEHICLE CONTROL DEVICE

(71) Applicants: TOYOTA JIDOSHA KABUSHIKI KAISHA, Toyota (JP); J-QUAD DYNAMICS INC., Tokyo (JP); ADVICS CO., LTD., Kariya (JP)

(72) Inventors: Kazuki Ninomiya, Toyota (JP); Masanobu Horio, Tokyo (JP); Atsushi Kuchinomachi, Tokyo (JP)

(73) Assignees: TOYOTA JIDOSHA KABUSHIKI KAISHA, Toyota (JP); J-QUAD DYNAMICS INC., Tokyo (JP); ADVICS CO., LTD., Kariya (JP)

( * ) Notice: Subject to any disclaimer, the term of this patent is extended or adjusted under 35 U.S.C. 154(b) by 30 days.

(21) Appl. No.: 18/745,571

(22) Filed: Jun. 17, 2024

(65) Prior Publication Data
US 2024/0425027 A1 Dec. 26, 2024

(30) Foreign Application Priority Data

Jun. 20, 2023 (JP) ................................. 2023-100722

(51) Int. Cl.
B60T 17/22 (2006.01)
B60T 13/74 (2006.01)

(52) U.S. Cl.
CPC .............. B60T 17/22 (2013.01); B60T 13/74 (2013.01)

(58) Field of Classification Search
CPC .. B60W 30/06; B60W 30/0956; B60W 50/14; B60W 2050/146; B60T 8/885; B60T 13/74; B60T 17/22; B60T 2270/402;

B60T 8/172; B60T 8/175; B60T 7/12; B60T 13/741; B60T 17/18; B60T 2201/06; B60T 2240/06; B60T 2270/40; B60T 2270/413
USPC ...................................... 701/70–92
See application file for complete search history.

(56) References Cited

U.S. PATENT DOCUMENTS

| | | | | |
|---|---|---|---|---|
| 9,840,241 B2* | 12/2017 | Murata | .................. | B60T 7/042 |
| 10,442,413 B2* | 10/2019 | Tanaka | .................. | F16D 65/183 |
| 2007/0029876 A1 | 2/2007 | Makishima et al. | | |
| 2007/0114843 A1* | 5/2007 | Kawahara | .............. | B60T 13/74 |
| | | | | 303/122 |
| 2017/0369047 A1* | 12/2017 | Okada | .................. | B60T 13/686 |
| 2020/0271224 A1* | 8/2020 | Kamio | ................. | B60T 13/662 |
| 2023/0256950 A1* | 8/2023 | Tsuchida | .............. | B60T 13/746 |
| | | | | 701/70 |

(Continued)

FOREIGN PATENT DOCUMENTS

JP 2007-076490 A 3/2007

*Primary Examiner* — Logan M Kraft
*Assistant Examiner* — Johnny H Hoang
(74) *Attorney, Agent, or Firm* — Oliff PLC

(57) ABSTRACT
A vehicle control device to be applied to a vehicle including parking brakes provided in association with right and left wheels and configured to be driven to bring the wheels into a non-rotatable state includes a processor. The processor is configured to acquire abnormality occurrence information on each of the right and left parking brakes. The processor is configured to, when an abnormality condition that a drive command is output to each of the parking brakes and one of the parking brakes has an abnormality is satisfied, control a device other than the parking brakes in the vehicle to suppress rotation of the wheel provided with the parking brake having the abnormality.

4 Claims, 3 Drawing Sheets

(56) References Cited

U.S. PATENT DOCUMENTS

2024/0157921 A1* 5/2024 Marx ........................ B60T 8/30
2024/0166177 A1* 5/2024 Saotome ................. B60T 8/171

* cited by examiner

VEHICLE CONTROL DEVICE

CROSS-REFERENCE TO RELATED APPLICATION

This application claims priority to Japanese Patent Application No. 2023-100722 filed on Jun. 20, 2023, incorporated herein by reference in its entirety.

BACKGROUND

1. Technical Field

The present disclosure relates to a vehicle control device.

2. Description of Related Art

A vehicle disclosed in Japanese Unexamined Patent Application Publication No. 2007-076490 (JP 2007-076490 A) includes parking brakes for parking. The parking brakes are provided in association with right and left rear wheels. The parking brakes are electrically driven. When an occupant operates an operation switch, driving power is supplied to actuators. The actuators then drive the parking brakes. Thus, the rear wheels come into a non-rotatable state.

SUMMARY

It is assumed that a vehicle like the one in JP 2007-076490 A is parked on a slope using the parking brake and the right or left parking brake is malfunctioning. When one of the parking brakes malfunctions in this way, the wheel with the normal parking brake is not rotatable, but the wheel with the malfunctioning parking brake is rotatable. In this case, the vehicle turns due to its own weight about the wheel that is braked by the normal parking brake.

With a first aspect of the present disclosure, a vehicle control device to be applied to a vehicle including parking brakes provided in association with right and left wheels and configured to be driven to bring the wheels into a non-rotatable state includes a processor. The processor is configured to acquire abnormality occurrence information on each of the right and left parking brakes. The processor is configured to, when an abnormality condition that a drive command is output to each of the parking brakes and one of the parking brakes has an abnormality is satisfied, control a device other than the parking brakes in the vehicle to suppress rotation of the wheel provided with the parking brake having the abnormality.

In the vehicle control device according to the first aspect of the present disclosure, the wheels provided with the parking brakes may be rear wheels. The vehicle may include a steering device configured to change steering angles of right and left front wheels. The processor may be configured to perform control to increase the steering angles of the right and left front wheels to an abnormal side compared to the steering angles at a time when occurrence of the abnormality in the parking brake is detected. The abnormal side may be a side where the parking brake has the abnormality among the right and left parking brakes.

In the vehicle control device according to the first aspect of the present disclosure, the vehicle may include wheel speed sensors provided in association with the right and left rear wheels. The processor may be configured to, when a turning condition that an absolute value of one of wheel speeds detected by the right and left wheel speed sensors is equal to or larger than a first specified value and an absolute value of the other of the wheel speeds is smaller than a second specified value is satisfied and the abnormality condition is satisfied, perform the control to increase the steering angles of the right and left front wheels to the abnormal side compared to the steering angles at the time when the occurrence of the abnormality in the parking brake is detected.

In the vehicle control device according to the first aspect of the present disclosure, the first specified value and the second specified value may be a same value.

In the vehicle control device according to the first aspect of the present disclosure, the processor may be configured to set a larger amount of change in the steering angles of the right and left front wheels as a difference between the absolute value of one of the wheel speeds detected by the right and left wheel speed sensors and the absolute value of the other of the wheel speeds increases.

With the above configuration, it is possible to suppress the turning of the vehicle when the right or left parking brake has an abnormality.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A vehicle control device according to an embodiment will be described below with reference to the drawings.

Overall Configuration of Vehicle

Figure 1:
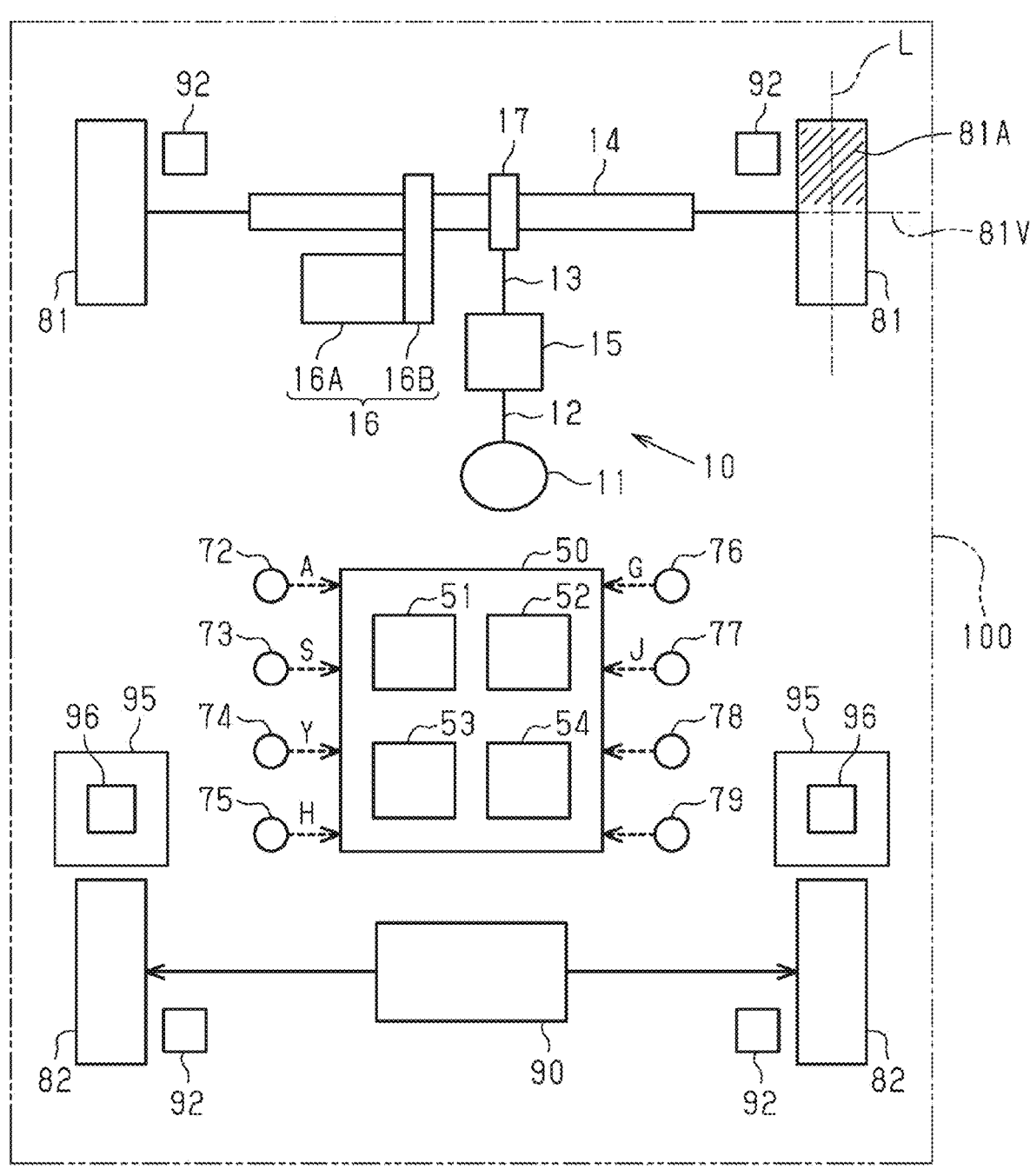
FIG. 1 is a schematic configuration diagram of a vehicle.

As shown in FIG. 1, the vehicle 100 includes a drive source 90 for the vehicle 100. An example of the drive source 90 for the vehicle 100 is an internal combustion engine. Another example of the drive source 90 for the vehicle 100 is a motor generator. The driving force output by the drive source 90 for the vehicle 100 is transmitted to rear wheels 82 that are driving wheels.

The vehicle 100 includes four service brakes 92. The service brakes 92 are provided in association with four right and left front and rear wheels. The service brakes 92 are hydraulic brakes. That is, the service brake 92 brakes each wheel by operating based on a hydraulic pressure. Examples of the service brake 92 include a disc brake.

The vehicle 100 includes two parking brakes 95. The parking brakes 95 are provided in association with the right and left rear wheels 82. The parking brakes 95 are electrically driven. Each parking brake 95 includes a brake shoe and an actuator 96. The brake shoe is positioned inside a brake drum that rotates together with the rear wheel 82. The actuator 96 includes a motor and a reduction gear mechanism. The actuator 96 pushes the brake shoe against the brake drum or moves the brake shoe away from the brake drum in response to the drive of the motor. When the brake shoe is pushed against the brake drum, the rear wheel 82 is not rotatable. In this state, the parking brake 95 is ON. When the brake shoe moves away from the brake drum, the rear wheel 82 is rotatable. In this state, the parking brake 95 is OFF.

The vehicle 100 includes a steering system 10. The steering system 10 includes a steering wheel 11, an input shaft 12, an output shaft 13, a steering operation shaft 14, an adjustment device 15, a steering operation device 16, and a conversion mechanism 17. The steering wheel 11 rotates together with the input shaft 12. The input shaft 12 is connected to the output shaft 13 via the adjustment device 15. The output shaft 13 is connected to the steering operation shaft 14 via the conversion mechanism 17. The conversion mechanism 17 converts rotational motion of the output shaft 13 into linear motion of the steering operation shaft 14. Both ends of the steering operation shaft 14 are connected to right and left front wheels 81 via tie rods. When the steering operation shaft 14 operates in response to the operation of the steering wheel 11, steering angles F of the right and left front wheels 81 change.

Figure 2:
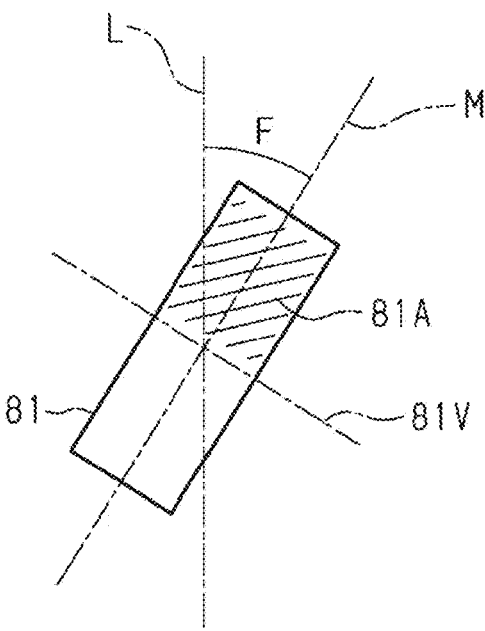
FIG. 2 is an explanatory diagram of a steering angle.

An angular position of the front wheel 81 when the vehicle 100 travels straightforward will be referred to as "neutral position L". A portion of the front wheel 81 that is positioned on a front side of a central axis 81V of the front wheel 81 in a top view of the vehicle 100 will be referred to as "front portion 81A". In FIGS. 1 and 2, the front portion 81A is hatched. As shown in FIG. 2, the steering angle F of the front wheel 81 is an inclination angle of an angular position M of the front portion 81A with respect to the neutral position L.

As shown in FIG. 1, the adjustment device 15 is positioned between the input shaft 12 and the output shaft 13. The adjustment device 15 includes a motor. When the motor is driven, the output shaft 13 rotates relative to the input shaft 12. By the relative rotation, the ratio of the steering angle F of the front wheel 81 to a rotation angle H of the steering wheel 11 can be adjusted.

The steering operation device 16 includes a motor 16A and a transmission mechanism 16B. The motor 16A is connected to the steering operation shaft 14 via the transmission mechanism 16B. The transmission mechanism 16B converts rotational motion of the motor 16A into linear motion of the steering operation shaft 14. Therefore, when the steering operation shaft 14 operates linearly in response to the drive of the motor 16A, the steering angles F of the right and left front wheels 81 change. The steering operation device 16 constitutes a steering device. As can be seen from the configuration of the steering system 10 described above, the front wheels 81 can be turned but the rear wheels 82 cannot be turned in the present embodiment.

The vehicle 100 includes a control device 50. The control device 50 is a computer including a processing circuit (processor). The processing circuit includes a central processing unit (CPU) and a memory. The memory prestores various programs describing processes to be executed by the CPU and various types of data required for the CPU to execute the programs. The CPU functions as a drive system control unit 51, a brake control unit 52, a steering control unit 53, and an application execution unit 54 by executing the programs stored in the memory. That is, the control device 50 includes the drive system control unit 51, the brake control unit 52, the steering control unit 53, and the application execution unit 54 as functional units. These functional units perform dedicated processes and exchange information with each other. The processes to be performed by these functional units may be implemented by separate control devices.

The drive system control unit 51 controls the drive source 90 for the vehicle 100. The brake control unit 52 controls the parking brakes 95 and the service brakes 92. The steering control unit 53 controls the adjustment device 15 and the steering operation device 16. The application execution unit 54 outputs motion requests related to the vehicle 100 to the drive system control unit 51, the brake control unit 52, and the steering control unit 53 by executing an application stored in the memory. The application is a type of program. An example of the application is an autonomous driving (AD) application. The AD application implements an autonomous driving function that causes the vehicle 100 to travel autonomously.

The vehicle 100 includes two current sensors 72, four wheel speed sensors 73, a yaw rate sensor 74, a steering wheel angle sensor 75, a position acquisition device 76, and a camera 77 as information detection devices. The current sensors 72 are provided in association with the two parking brakes 95. In FIG. 1, one of the two current sensors 72 is shown as a representative. The current sensor 72 detects a current value (hereinafter referred to as "motor current value A") flowing through the motor of the actuator 96 in the parking brake 95. The wheel speed sensors 73 are provided in association with the right and left front and rear wheels. In FIG. 1, one of the four wheel speed sensors 73 is shown as a representative. The wheel speed sensor 73 detects a wheel speed S that is the rotational speed of the wheel. The wheel speed sensor 73 detects a positive value when the vehicle 100 moves forward, and detects a negative value when the vehicle 100 moves rearward. The wheel speed sensor 73 may constantly detect a positive value regardless of the traveling direction of the vehicle 100. The yaw rate sensor 74 detects a yaw rate Y of the vehicle 100. The steering wheel angle sensor 75 detects the rotation angle H of the steering wheel 11. The position acquisition device 76 acquires information on current position coordinates G of the vehicle 100 from global positioning satellites. The camera 77 acquires imaging information J on the surroundings of the vehicle 100. Each information detection device repeatedly outputs the information detected or acquired by itself to the control device 50. The control device 50 repeatedly acquires the information from each information detection device.

The vehicle 100 includes a start switch 78 and a parking switch 79. The start switch 78 is also referred to as "ignition switch" or "system start switch". The start switch 78 is a switch for starting a main system of the control device 50. The start switch 78 is turned ON or OFF in response to an occupant's operation. When the start switch 78 is ON, the control device 50 is in an activated state. When the start switch 78 is OFF, the control device 50 is basically in a stopped state. Even when the start switch 78 is OFF, some functional units of the control device 50 can continue processes as necessary. The parking switch 79 is a switch for switching the operation states of the parking brakes 95. The parking switch 79 is turned ON or OFF in response to an occupant's operation.

Functions of Brake Control Unit

The brake control unit 52 switches the operation states of the parking brakes 95 based on the operation state of the parking switch 79. The brake control unit 52 outputs a drive command to the actuator 96 of each parking brake 95 when the parking switch 79 is turned ON. The drive command is a command to switch the parking brake 95 from OFF to ON.

When the brake control unit 52 outputs the drive command, the parking brake 95 is driven. That is, in the parking brake 95, a current flows through the motor of the actuator 96. Along with this, the actuator 96 operates to push the brake shoe against the brake drum. Thus, the parking brake 95 brings the rear wheel 82 into a non-rotatable state. That is, the parking brake 95 is turned ON. The brake control unit 52 can grasp the switching state of the parking brake 95, for example, based on the motor current value A.

The brake control unit 52 outputs a release command to the actuator 96 of each parking brake 95 when the parking switch 79 is turned OFF. The release command is a command to switch the parking brake 95 from ON to OFF. When the brake control unit 52 outputs the release command, the parking brake 95 is released. That is, in the parking brake 95, a current flows through the motor of the actuator 96. Along with this, the actuator 96 operates to move the brake shoe away from the brake drum. Thus, the parking brake 95 brings the rear wheel 82 into a rotatable state. That is, the parking brake 95 is turned OFF The brake control unit 52 may output the drive command or the release command based on the motion request from the application execution unit 54. The brake control unit 52 monitors the parking brake 95 for an abnormality when switching the parking brake 95 from OFF to ON. Specifically, when the brake control unit 52 outputs the drive command, the brake control unit 52 monitors the motor current value A. The brake control unit 52 detects the occurrence of an abnormality in the parking brake 95 when the motor current value A continues to be equal to or smaller than a threshold for a predetermined period. The threshold is determined in advance through experiments etc. as a value that can be used to grasp that the motor of the actuator 96 is not able to output a normal torque. The predetermined period is determined in advance through experiments etc. as a value that can be used to determine that the abnormal state of the current value is not a temporary state caused by noise etc. but is clearly continuing. The brake control unit 52 of the present embodiment substantially detects, as an abnormality, a situation in which the parking brake 95 is not switched ON even though the drive command is output. The brake control unit 52 individually monitors each of the right and left parking brakes 95 for an abnormality. When the occurrence of an abnormality in the parking brake 95 is detected, the brake control unit 52 switches an abnormality flag from OFF to ON. The abnormality flag is prepared for each parking brake 95. When the occurrence of an abnormality in the parking brake 95 is detected, the brake control unit 52 turns ON a notification lamp provided in a vehicle cabin.

Addressing Process

When the brake control unit 52 outputs the drive command to each parking brake 95, the steering control unit 53 repeatedly determines whether an abnormality condition is satisfied until each parking brake 95 is switched ON. The abnormality condition is that the brake control unit 52 outputs the drive command to each parking brake 95 and the right or left parking brake 95 has an abnormality. The state in which the drive command is output means a state in which the drive command is output from the brake control unit 52. Once the brake control unit 52 outputs the drive command, the steering control unit 53 handles the current state as the state in which the drive command is output until the brake control unit 52 outputs the release command subsequently even if the output of the drive command is interrupted afterwards. That is, in the abnormality condition, the requirement that the drive command is output to each parking brake 95 corresponds to a requirement that is a period from the output of the drive command to each parking brake 95 by the brake control unit 52 (from the start of output) to the output of the release command. The steering control unit 53 can grasp the occurrence of an abnormality in the parking brake 95 by referring to the abnormality flag set by the brake control unit 52. When the abnormality condition is satisfied, the steering control unit 53 identifies, as an abnormal side, the "right" or "left" parking brake 95 that has the abnormality. The steering control unit 53 identifies the side opposite to the abnormal side as a normal side. Then, the steering control unit 53 starts an addressing process. The addressing process is a process for addressing an abnormality when the abnormality has occurred in the right or left parking brake 95.

Figure 3:
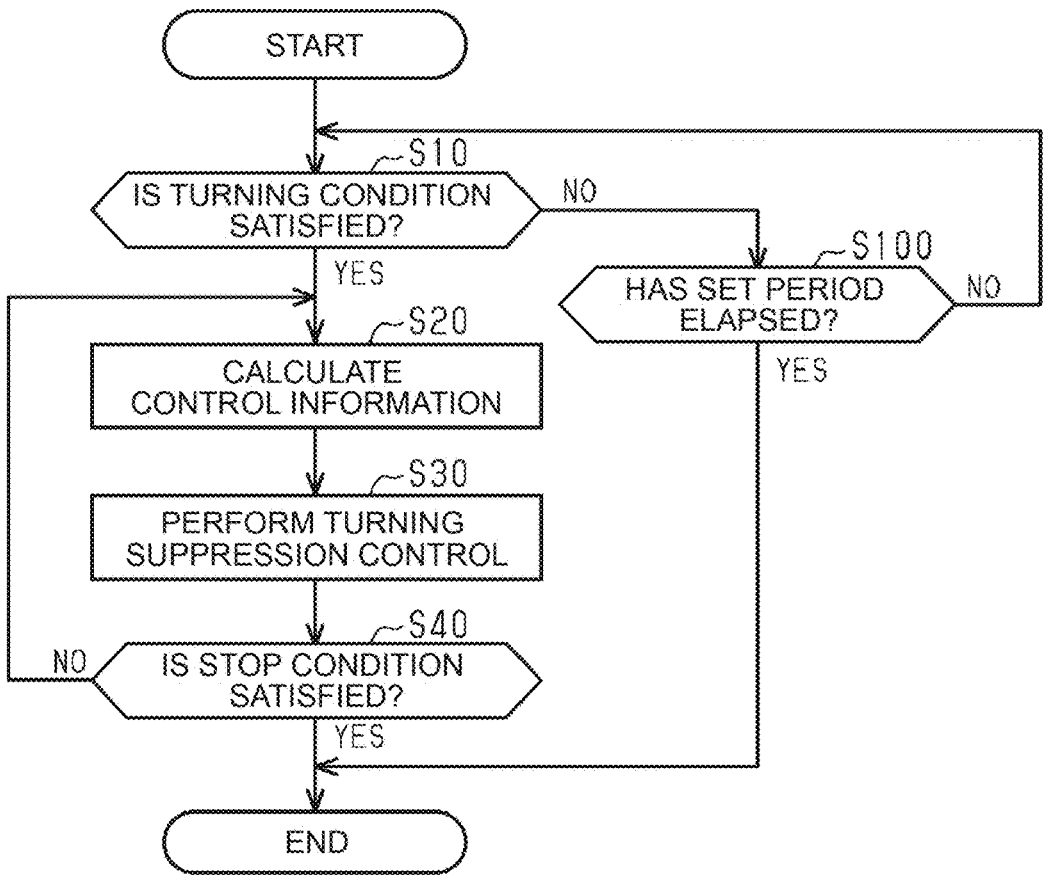
FIG. 3 is a flowchart showing a processing procedure of an addressing process.

As shown in FIG. 3, the steering control unit 53 first performs a process of step S10 when the addressing process is started. In step S10, the steering control unit 53 determines whether a turning condition is satisfied. The turning condition is that the absolute value of the wheel speed S detected by a first wheel speed sensor is equal to or larger than a specified value SK and the absolute value of the wheel speed S detected by a second wheel speed sensor is smaller than the specified value SK. The specified value SK may be a first specified value and a second specified value that is smaller than the first specified value. In this case, the turning condition is that the absolute value of the wheel speed S detected by the first wheel speed sensor may be equal to or larger than the first specified value SK and the absolute value of the wheel speed S detected by the second wheel speed sensor is smaller than the second specified value SK. The first wheel speed sensor is a wheel speed sensor 73 that detects the wheel speed S of the rear wheel 82 on the abnormal side. The second wheel speed sensor is a wheel speed sensor 73 that detects the wheel speed S of the rear wheel 82 on the normal side. The specified value SK is determined in advance through experiments etc. as a value that can be used to grasp the turning of the vehicle 100. The turning of the vehicle 100 will be described later in the section of "Operations of Embodiment". The steering control unit 53 determines whether the turning condition is satisfied based on the latest pieces of detection information from the first wheel speed sensor and the second wheel speed sensor. When the steering control unit 53 determines that the turning condition is not satisfied, the process proceeds to step S100.

In step S100, the steering control unit 53 determines whether the elapsed period since the start of the addressing process has reached a set period. The set period is determined in advance through experiments etc. as a length of time that can be used to clearly determine that the vehicle 100 does not turn. When the set period has not yet elapsed since the start of the addressing process (step S100: NO), the steering control unit 53 returns to the process of step S10. Then, the steering control unit 53 performs the process of step S10 again. Regarding steps S10 and S100, the steering control unit 53 terminates the addressing process when the set period has elapsed without satisfaction of the turning condition (step S10: NO, step S100: YES). When the turning condition is satisfied (step S10: YES) before the set period elapses (step S100: NO), the steering control unit 53 advances the process to step S20.

In step S20, the steering control unit 53 calculates control information for performing turning suppression control. The turning suppression control is control for suppressing the rotation of the rear wheel 82 on the abnormal side. The turning suppression control of the present embodiment is performed on the steering operation device 16 as a control target. The steering control unit 53 handles the sign of the steering angle F under the following rule during the addressing process. That is, the steering control unit 53 handles the neutral position L as zero degrees, the abnormal side with respect to the neutral position L as a positive value, and the normal side with respect to the neutral position L as a negative value. In the turning suppression control under this handling, the steering control unit 53 increases the steering angles F of the right and left front wheels 81 to the abnormal side compared to those at the time when the occurrence of the abnormality in the parking brake 95 is detected. The steering angles F of the front wheels 81 at the time when the occurrence of the abnormality in the parking brake 95 is detected are substantially the same as the steering angles F of the front wheels 81 at the time of step S20. The angular position of each front wheel 81 at the time when the occurrence of the abnormality in the parking brake 95 is detected will be referred to as "reference position". In the turning suppression control, the steering control unit 53 turns the front portion 81A of each front wheel 81 to the abnormal side with respect to the reference position.

The control information for performing the turning suppression control is specifically a target rotation amount and a target rotation direction of the motor 16A in the steering operation device 16. In calculating the control information, the steering control unit 53 first calculates a speed difference ΔS. The speed difference ΔS is the absolute value of a difference between the absolute value of the wheel speed S detected by the first wheel speed sensor and the absolute value of the wheel speed S detected by the second wheel speed sensor. The steering control unit 53 calculates the speed difference ΔS based on the latest pieces of detection information from the first wheel speed sensor and the second wheel speed sensor. After the speed difference ΔS is calculated, the steering control unit 53 calculates the target rotation amount. As a premise for the steering control unit 53 to calculate the target rotation amount, the memory of the control device 50 prestores a steering operation map. The steering operation map represents a correspondence between the following two variables. One variable is the difference between the absolute values of the rotational speeds of the right and left rear wheels 82, that is, the speed difference ΔS. The other variable is a necessary steering operation amount ΔF. The necessary steering operation amount ΔF is an amount of change in the steering angle F of each front wheel 81 that is necessary to stop the rotation of the rear wheel 82 on the abnormal side and thus the turning of the vehicle 100. The necessary steering operation amount ΔF is based on the premise that each front wheel 81 is turned from the reference position to the abnormal side. Both the speed difference ΔS and the necessary steering operation amount ΔF take positive values. In the steering operation map, the necessary steering operation amount ΔF increases as the speed difference ΔS increases. The steering control unit 53 calculates the control information by using this steering operation map. Specifically, the steering control unit 53 applies the latest speed difference ΔS calculated above to the steering operation map. The steering control unit 53 calculates the necessary steering operation amount ΔF associated with the latest speed difference ΔS based on the steering operation map. The steering control unit 53 converts the calculated necessary steering operation amount ΔF into a rotation amount of the motor 16A based on a predetermined relational expression. The steering control unit 53 calculates the converted rotation amount of the motor 16A as the target rotation amount. After the target rotation amount is calculated, the steering control unit 53 determines the target rotation direction of the motor 16A. In the present embodiment, the rotation direction of the motor 16A and the turning of each front wheel 81 have the following correspondence. It is assumed that the front wheel 81 is in the neutral position L. When the motor 16A rotates in a first direction, the front portion 81A of the front wheel 81 is turned to the left with respect to the neutral position L. When the motor 16A rotates in a second direction opposite to the first direction, the front portion 81A of the front wheel 81 is turned to the right with respect to the neutral position L. The memory of the control device 50 prestores this correspondence between the rotation direction of the motor 16A and the turning of the front wheel 81. Based on this correspondence, the steering control unit 53 determines the target rotation direction of the motor 16A to turn the front wheel 81 to the abnormal side. That is, when the abnormal side is "left", the steering control unit 53 sets the target rotation direction to the first direction. When the abnormal side is "right", the steering control unit 53 sets the target rotation direction to the second direction. After the target rotation amount and the target rotation direction of the motor 16A are determined, the steering control unit 53 advances the process to step S30.

In step S30, the steering control unit 53 performs the turning suppression control based on the control information calculated in step S20. That is, the steering control unit 53 controls the motor 16A to rotate by the target rotation amount in the target rotation direction determined in step S20. Then, the steering control unit 53 advances the process to step S40.

In step S40, the steering control unit 53 determines whether a stop condition is satisfied. The stop condition is that the absolute value of the wheel speed S detected by the first wheel speed sensor is smaller than the specified value SK and the absolute value of the wheel speed S detected by the second wheel speed sensor is smaller than the specified value SK. The steering control unit 53 determines whether the stop condition is satisfied based on the latest pieces of detection information from the first wheel speed sensor and the second wheel speed sensor. When the stop condition is not satisfied (step S40: NO), the steering control unit 53 returns to the process of step S20. In this case, the steering control unit 53 performs the processes of steps S20, S30, and S40 again. The steering control unit 53 repeats the processes of steps S20, S30, and S40 until the stop condition is satisfied. When the stop condition is satisfied (step S40: YES), the steering control unit 53 terminates the addressing process. The stop condition may be satisfied when the process proceeds to step S40 for the first time after the start of the addressing process. In this case, the steering control unit 53 terminates the addressing process at that point.

The parking switch 79 is often turned ON immediately before the occupant finishes using the vehicle 100 and turns OFF the start switch 78. In connection with this, the start switch 78 may be turned OFF during the addressing process. In this case, the steering control unit 53 is set to function as follows. That is, the steering control unit 53 continues to be activated and performs the series of processes of the addressing process until the addressing process is completed. After the addressing process is completed, the steering control unit 53 comes into the stopped state in which no process is performed. Similarly to the steering control unit 53, the brake control unit 52 continues its processes until the steering control unit 53 completes the addressing process.

The steering control unit 53 terminates the addressing process during the addressing process in the following case. That is, the steering control unit 53 terminates the addressing process when the brake control unit 52 outputs the release command during the addressing process. In this case, the steering control unit 53 shifts to another process requested by the occupant or the application.

Operations of Embodiment

Figure 4:
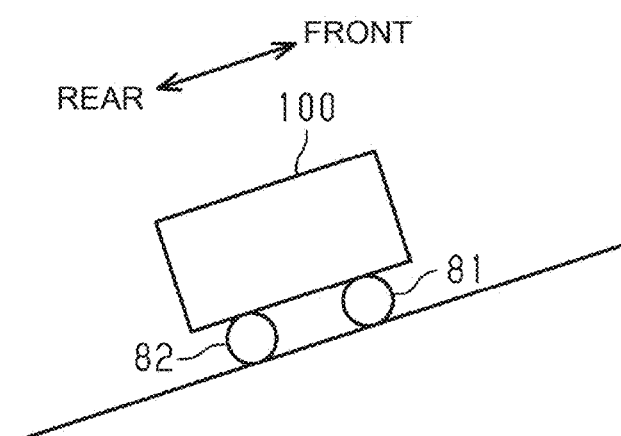
FIG. 4 is a schematic diagram showing the vehicle located on an uphill road.
Figure 5:
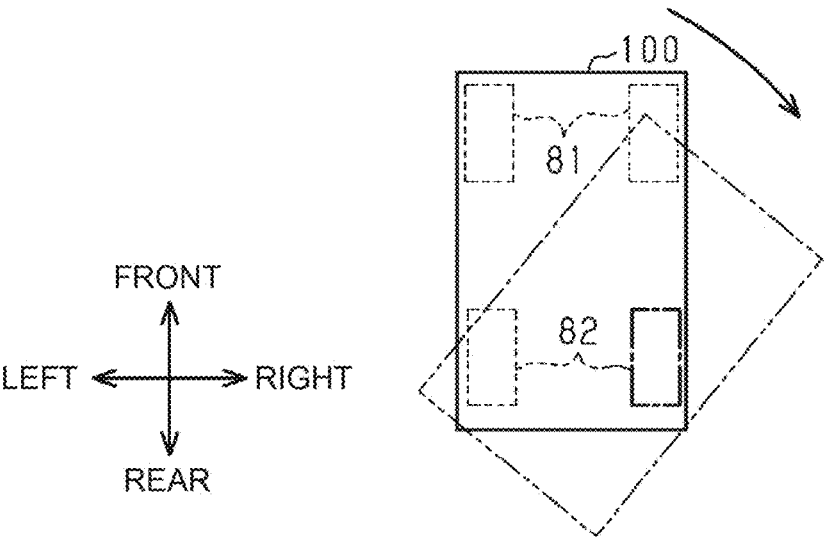
FIG. 5 is a schematic diagram showing the turning vehicle.

As shown in FIG. 4, it is assumed that the vehicle 100 is located on an uphill road with a relatively large gradient. It is assumed that the occupant turns ON the parking switch 79 to park the vehicle 100 on this uphill road. Then, the brake control unit 52 outputs the drive command to the parking brakes 95. As shown in FIG. 5, it is assumed that, out of the right and left parking brakes 95, the left parking brake 95 operates normally but the right parking brake 95 has an abnormality and does not operate normally. In this case, the right rear wheel 82 shown by the long dashed short dashed line in FIG. 5 is not braked by the parking brake 95. If no action is taken at this time, the vehicle 100 turns to the right about the left rear wheel 82 on the normal side as shown by the long dashed double-short dashed line in FIG. 5.

Figure 6:
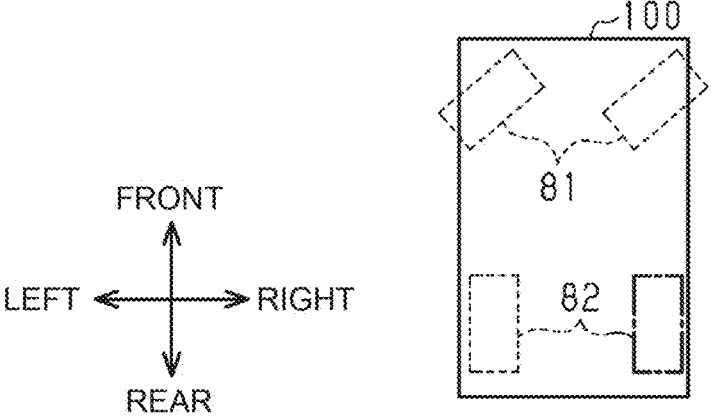
FIG. 6 is a schematic diagram showing turned front wheels.

To prevent such turning, the steering control unit 53 of the present embodiment performs the turning suppression control through the addressing process. That is, as shown in FIG. 6, the steering control unit 53 controls the steering operation device 16 to turn the front portions 81A of the right and left front wheels 81 to the right with respect to the reference positions. Then, the steering control unit 53 increases the steering angles F of the right and left front wheels 81 to the right side. When the right and left front wheels 81 are turned to the right, a force is applied to the vehicle 100 in a direction opposite to the abnormal turning direction. The abnormal turning direction is the direction in which the vehicle 100 will turn about the rear wheel 82 on the normal side. The turning of the vehicle 100 can be prevented by applying the force to the vehicle 100 in the direction opposite to the abnormal turning direction. Regarding the addressing process, the steering control unit 53 finely adjusts the steering angles F of the front wheels 81 by repeating the processes of steps S20, S30, and S40 until the turning of the vehicle 100 is stopped. Accordingly, the steering angles F of the front wheels 81 are optimized to prevent the turning of the vehicle 100.

Effects of Embodiment (1) As described in "Operations of Embodiment", in the present embodiment, the turning of the vehicle 100 can be prevented by turning the front wheels 81 when the right or left parking brake 95 has an abnormality.

(2) Even if the right or left parking brake 95 has an abnormality, there is a possibility that the vehicle 100 does not turn, for example, when the road surface gradient is gentle. When the vehicle 100 does not turn, there is no need to perform the turning suppression control. In the present embodiment, the turning suppression control is performed after grasping that the vehicle 100 has actually started turning through the process of step S10. In this way, it is possible to prevent unnecessary turning suppression control. Thus, it is possible to eliminate the processing load on the control device 50 along with the turning suppression control and the power consumption of the steering operation device 16 along with the turning suppression control.

(3) When performing the turning suppression control, the turning of the vehicle 100 cannot be stopped if the amount of change in the steering angles F of the front wheels 81 is too small. If the amount of change in the steering angles F of the front wheels 81 is too large, the vehicle 100 may turn in a direction opposite to the abnormal turning direction. In the present embodiment, the steering angles F of the front wheels 81 are changed by an amount corresponding to the amount of the turning of the vehicle 100 in the abnormal turning direction. Therefore, the turning of the vehicle 100 can be stopped appropriately.

Modifications

The above embodiment can be modified as follows. The above embodiment and the following modifications can be combined with each other as long as no technical contradiction arises.

The method for detecting an abnormality in the parking brake 95 is not limited to the example of the above embodiment. For example, determination may be made that the parking brake 95 has an abnormality when the motor current value A is larger than a predetermined upper limit value. For example, an abnormality in the parking brake 95 may be detected by using a variable that reflects transition of the motor current value A, such as a differential value of the motor current value A. An abnormality in the parking brake 95 may be detected by using a variable other than the motor current value A. For example, the temperature of the motor of the actuator 96 may be used as the variable other than the motor current value A to detect an abnormality in the parking brake 95. Determination may be made that the parking brake 95 has an abnormality when the temperature of the motor is outside a permissible range. In this case, it is appropriate that the vehicle 100 include a temperature sensor that detects the temperature of the motor. The method for detecting an abnormality in the parking brake 95 is not limited to the method that can detect the situation in which the parking brake 95 is not switched ON, but may be any method by which determination can be made that the parking brake 95 is not normal.

The timing to monitor the parking brake 95 for an abnormality is not limited to the timing to switch the parking brake 95 from OFF to ON. For example, the parking brake 95 may constantly be monitored for an abnormality while the start switch 78 is ON.

When turning the front wheels 81 by the turning suppression control, it is not essential to increase the amount of change in the steering angles F of the front wheels 81 as the speed difference ΔS increases. For example, the front wheels 81 may be turned to the maximum angular positions permitted for the front wheels 81 regardless of the magnitude of the speed difference ΔS. The turning of the vehicle 100 can be prevented by taking such action, for example, in a case where the road surface gradient is small to some extent.

When turning the front wheels 81 by the turning suppression control, it is not essential to determine the amount of change in the steering angles F of the front wheels 81 by using the pieces of detection information from the wheel speed sensors 73. For example, the amount of change in the steering angles F of the front wheels 81 may be determined based on detection information from the yaw rate sensor 74. In this case, it is conceivable to determine the amount of change in the steering angles F of the front wheels 81 so that the yaw rate Y of the vehicle 100 reaches zero.

The process of step S10 may be omitted. That is, the turning suppression control may be performed when the abnormality condition is satisfied regardless of whether the turning condition is satisfied. For example, when the abnormality condition is satisfied, the front wheels 81 may be turned to the maximum angular positions permitted for the front wheels 81 as in the above modification.

The adjustment device 15 may be used instead of the steering operation device 16 as the steering device to be controlled in the turning suppression control in step S30. By controlling the adjustment device 15, the steering angles F of the front wheels 81 may be increased to the abnormal side.

When the device to be controlled in the turning suppression control (hereinafter referred to as "target device") is changed from that of the above embodiment as in the above modification, it is appropriate to change the control information calculated in step S20 accordingly.

The target device for the turning suppression control is not limited to the steering device that can change the steering angles F of the right and left front wheels 81. The target device may be any device other than the parking brake 95 as long as the device can suppress the rotation of the rear wheel 82 on the abnormal side. The control to be performed in the turning suppression control is not limited to the control for turning the front wheels 81. It is only necessary that the rotation of the rear wheel 82 be suppressed by the turning suppression control. For example, the vehicle 100 may include a steering wheel locking device. The steering wheel locking device may be used as the target device. The steering wheel locking device fixes the right and left front wheels 81 at the neutral positions L. In the turning suppression control, the front wheels 81 may be fixed at zero degrees by operating this device. As long as the front wheels 81 are not turned, the vehicle 100 does not turn even if the right or left parking brake 95 has an abnormality. For example, the drive source 90 for the vehicle 100 may be used as the target device. In the turning suppression control, the rotation of the rear wheel 82 on the abnormal side may be suppressed by applying the driving force of the drive source 90 for the vehicle 100 to the rear wheel 82. The drive source 90 for the vehicle 100 is being driven while the start switch 78 of the vehicle 100 is ON. Therefore, the drive source 90 for the vehicle 100 can function as the target device. For example, the service brake 92 may be used as the target device. In the turning suppression control, a braking force may be applied to the rear wheel 82 that is to be braked by the parking brake 95 having an abnormality. The service brakes 92 may apply braking forces to all of the right and left front and rear wheels.

The process of step S40 may be unnecessary in the addressing process depending on the target device as in a case where a steering wheel locking device is used as the target device. In such a case, the process of step S40 may be omitted and the addressing process may be terminated along with the completion of the turning suppression control.

The configuration of the parking brake 95 is not limited to the example of the above embodiment. It is only necessary that the parking brake 95 be electrically driven and the wheel can be brought into a non-rotatable state by driving the parking brake 95.

The parking brakes 95 may be provided in association with the right and left front wheels 81 and the right and left rear wheels 82 may be turnable. In this case, when the right or left parking brake 95 has an abnormality while the vehicle 100 is located on a downhill road, the vehicle 100 may turn about the front wheel 81 on the normal side. To prevent such turning of the vehicle 100, the turning suppression control may be performed when the abnormality condition is satisfied. The turning suppression control in this case may be any control that can suppress the rotation of the front wheel 81 on the abnormal side.

The AD application may be an application that achieves the following. Various processes that are actually performed by the control device 50 will hereinafter be described as being performed by the AD application. It is assumed that the parking brakes 95 are provided in association with the rear wheels 82 and the front wheels 81 are turnable as in the above embodiment.

The AD application constantly monitors the parking brakes 95 for an abnormality while the vehicle 100 is traveling. The AD application permits parking on a slope when each parking brake 95 has no abnormality. The AD application prohibits parking on a slope when the right or left parking brake 95 has an abnormality. That is, the AD application always causes the vehicle to be parked on a flat road when the right or left parking brake 95 has an abnormality. When parking the vehicle on a flat road in response to an abnormality in the parking brake 95, the AD application uses information from the camera 77 to stop the vehicle 100 at a position adjacent to a curb on the road. At this time, the AD application positions the curb on the abnormal side of the vehicle 100. Then, the AD application outputs the drive command to each parking brake 95 and turns the right and left front wheels 81 to the abnormal side so that the front wheel 81 on the abnormal side comes into contact with the curb. Thus, the front wheel 81 on the abnormal side is supported by the curb.

What is claimed is:

1. A vehicle control device to be applied to a vehicle including parking brakes provided in association with right and left wheels and configured to be driven to bring the wheels into a non-rotatable state, the vehicle control device comprising a processor configured to:

acquire abnormality occurrence information on each of the right and left parking brakes; and when an abnormality condition that a drive command is output to each of the parking brakes and one of the parking brakes has an abnormality is satisfied, control a device other than the parking brakes in the vehicle to suppress rotation of the wheel provided with the parking brake having the abnormality, wherein:

the wheels provided with the parking brakes are rear wheels;

the vehicle includes a steering device configured to change steering angles of right and left front wheels; and the processor is configured to perform control to increase the steering angles of the right and left front wheels to an abnormal side compared to the steering angles at a time when occurrence of the abnormality in the parking brake is detected, the abnormal side being a side where the parking brake has the abnormality among the right and left parking brakes.

2. The vehicle control device according to claim 1, wherein:

the vehicle includes wheel speed sensors provided in association with the right and left rear wheels; and the processor is configured to, when a turning condition that an absolute value of one of wheel speeds detected by the right and left wheel speed sensors is equal to or larger than a first specified value and an absolute value of the other of the wheel speeds is smaller than a second specified value is satisfied and the abnormality condition is satisfied, perform the control to increase the steering angles of the right and left front wheels to the abnormal side compared to the steering angles at the time when the occurrence of the abnormality in the parking brake is detected.

3. The vehicle control device according to claim 2, wherein the first specified value and the second specified value is a same value.

4. The vehicle control device according to claim 2, wherein the processor is configured to set a larger amount of change in the steering angles of the right and left front wheels as a difference between the absolute value of one of the wheel speeds detected by the right and left wheel speed sensors and the absolute value of the other of the wheel speeds increases.

\* \* \* \* \*